May 17, 1938.  F. G. CURTIS  2,117,405

HOLDER FOR TWIN PAILS

Filed April 15, 1936

Inventor
Frederick G. Curtis
By Trease and Bishop
Attorneys

Patented May 17, 1938

2,117,405

UNITED STATES PATENT OFFICE 2,117,405

HOLDER FOR TWIN PAILS

Frederick G. Curtis, Dover, Ohio, assignor to Reeves Steel and Manufacturing Company, Dover, Ohio, a corporation of Ohio Application April 15, 1936, Serial No. 74,579

6 Claims. (Cl. 220—94)

The invention relates to a holder for clamping two pails together for use as a unit and the present application pertains to an improvement upon my prior application for Holder for twin pails Serial No. 71,068, filed March 26, 1936. In my prior application, above referred to, is shown a holder for clamping two pails together as a unit so as to separately carry soapy water and clear water for cleaning, scrubbing, washing woodwork, walls and the like, the holder comprising a handle bail, a channel clip mounted thereon for engaging and clamping together adjacent portions of the rim beads of the two pails and a channel clip detachably connected to said handle bail for engaging and clamping together adjacent chime portions of the two pails.

In using a twin pail unit of this character, it is desirable that the pails be separated before the water is emptied therefrom and an object of the present invention is to provide a simple, easily operated holder which may be quickly and readily removed from the pails when it is desired to separate the same.

A further object is to simplify the construction and reduce the cost of production of a holder of this type.

A still further object is to provide a holder for twin pails comprising merely a clip for engaging and clamping together adjacent portions of the rim beads of the two pails, and a handle bail detachably connected to said clip.

Another object of the invention is to provide a holder of this character in which the handle bail prevents accidental removal of the clip from the rim bead portions of the pails.

A still further object is to provide a holder of this character in which a spring handle bail is quickly attached to or detached from the clip.

A further object is to provide an attaching clip having hook portions adapted to be inserted into openings formed adjacent to the bead portions of the pails.

Figure 2:
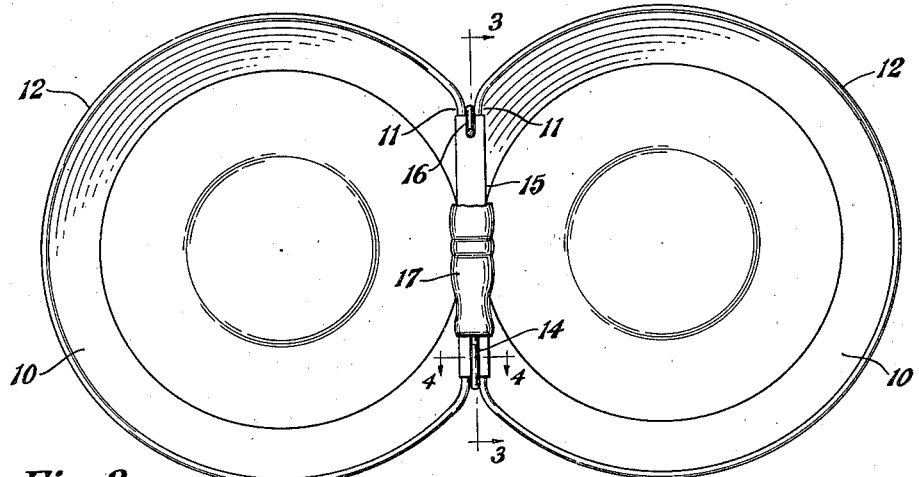
Figure 1:
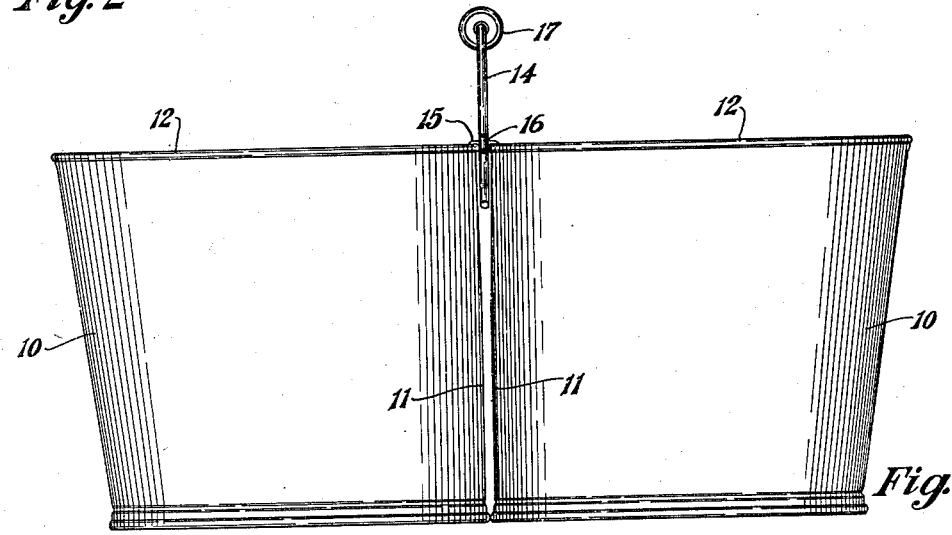
Figures 3, 4, 5:
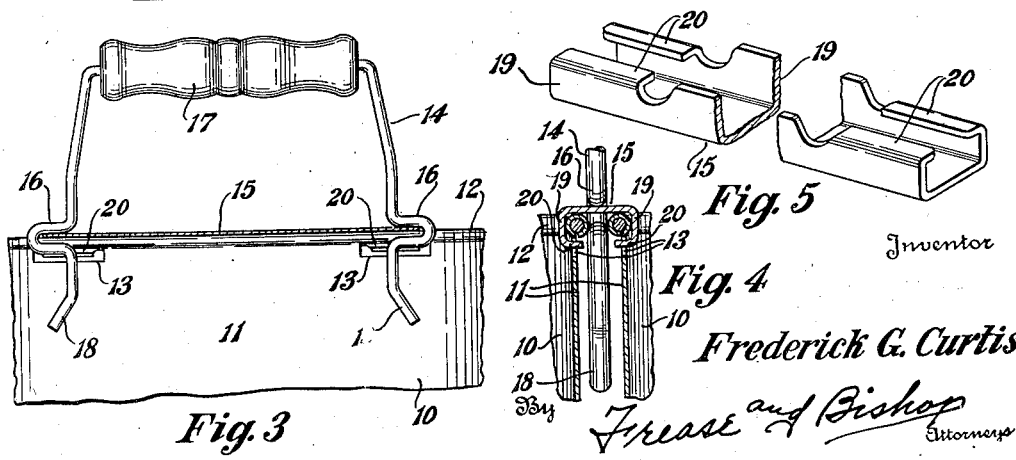

The above objects, together with others which will be apparent from the drawing and following description or which may be later pointed out, may be attained by constructing the improved holder in the manner illustrated in the accompanying drawing, in which Figure 1 is a side elevation of a pair of pails connected together with the improved holder;

Fig. 2, a top plan view of the pails and holder shown in Fig. 1;

Fig. 3, an enlarged fragmentary sectional elevation taken as on the line 3—3, Fig. 2;

Fig. 4, an enlarged fragmentary section taken as on the line 4—4, Fig. 2; and

Fig. 5, an enlarged inverted fragmentary perspective view of the channel clip forming a part of the holder.

Similar numerals refer to similar parts throughout the drawing.

The pails adapted to be used with the improved holder are indicated generally at 10 and may be substantially of usual and ordinary construction and design with the exception that the usual handle bails ordinarily provided upon such pails may be omitted and each pail is slightly flattened at one side, as indicated at 11.

Each pail is provided at spaced points on its flattened side, preferably just below the usual rim bead 12, with openings 13, preferably horizontally elongated, as best shown in Fig. 3.

The improved holder to which the invention pertains consists of only two main parts, comprising generally the handle bail 14 preferably formed of spring wire and the channel clamping clip indicated generally at 15, and adapted to be detachably connected to the handle bail, as will be later described in detail.

The handle bail 14 is preferably formed of a single piece of spring wire having the outturned, oppositely located, horizontally disposed, U-shaped bends 16 formed in the lower portions of the legs thereof.

A handle grip 17 of wood or the like may be provided upon the handle bail to facilitate carrying of the twin pails when they are filled with water. The lower free ends of the legs of the bail may be outwardly bent below the U-shaped portions 16, as shown at 18.

The channel clamping clip 15 may be formed of heavy gauge sheet metal and is provided on opposite sides with the downturned flanges 19 extending throughout its length, inturned hooks 20 being formed at the ends of said flanges and adapted to be received in the elongated apertures 13 of the pails.

In assembling the pails and holder together, the two pails are set with their flat faces together and the channel clamping clip 15 is engaged over the adjacent edge portions of the rim beads of the two pails, the hooks 20 thereof being engaged in the apertures 13 of the pails.

The handle bail is then attached to the clip by inserting the free ends of the legs between the pails at opposite ends of the channel clamping clip and pressing downward upon the bail so that it springs into position engaging the U-shaped bends over the opposite ends of the clip. The lower sides of these U-shaped bends 16 are received between the rim beads of the two pails, holding the same against the depending flanges 19 of the channel clip so that the hooks 20 of the clip cannot be accidentally displaced from the apertures 13 in the pail.

It is thus obvious that with this improved holder the two pails may be quickly and easily connected together and securely locked so that the pails may not become detached from each other until the holder is removed. This may be accomplished by springing the legs of the bail apart so as to disengage the U-shaped bends 16 thereof from engagement with the ends of the channel clip. With the bail removed, the channel clip may be quickly and easily disengaged from the two pails so that the water may be poured from each pail separately.

In shipping the pails and holders a number of the pails may be nested together and placed in a single carton and the holders for all of the units in the carton may be easily contained within the uppermost pail.

I claim:

1. In combination with two similar pails, a holder including a spring handle bail having U-shaped bends therein, and a clamping clip for engaging and clamping adjacent rim portions of the pails, said U-shaped bends of the handle bail being adapted to be engaged over the ends of said clip, the end portions of said bail being located between said rim portions of the pails to prevent accidental displacement of the clamping clip.

2. In combination with two similar pails having apertures at their rim portions, a holder including a spring handle bail having U-shaped bends therein, and a clamping clip for engaging and clamping adjacent rim portions of the pails and having hook portions for engaging said apertures, said U-shaped bends of the handle bail being adapted to be engaged over the ends of said clip between the rim portions of the pails for holding said hook portions in engagement with said apertures and for holding said handle bail in upright position.

3. In combination with two similar pails having apertures at their rim portions, an inverted channel-shaped clamping clip for engaging over adjacent rim portions of the pails and having inturned hook portions for engaging said apertures, and a detachable handle bail having inturned portions adapted to be engaged over the ends of the clip between the pails for holding said hook portions in engagement with said apertures.

4. In combination with two similar pails having apertures at their rim portions, a clamping clip having hook portions for engaging said apertures, and a detachable handle bail having inturned portions adapted to be engaged over the ends of the clip between the pails for holding said hook portions in engagement with said apertures.

5. In combination with two similar pails having rim beads, an inverted channel-shaped clip for engaging over adjacent rim portions of the pails and having inturned hook portions for engaging under said rim beads, and a detachable handle bail having inturned portions adapted to be engaged over the ends of the clip between the pails for holding said rim beads in engagement with said hook portions.

6. In combination with two similar pails having apertures at their rim portions, an inverted channel-shaped clamping clip for engaging over adjacent rim portions of the pails and having inturned hook portions for engaging said apertures, a handle bail connected to said clamping clip, and means inserted within said clamping clip between the pails for holding the hook portions in engagement with said apertures.

FREDERICK G. CURTIS.